United States Patent [19]

Troeder

[11] Patent Number: 4,662,492
[45] Date of Patent: May 5, 1987

[54] METHOD AND SYSTEM TO TRIGGER RELEASE OF A SAFETY DISCONNECT CLUTCH

[75] Inventor: Christoph Troeder, Aachen, Fed. Rep. of Germany

[73] Assignee: Ringspann Albrecht Maurer K.G., Bad Homburg, Fed. Rep. of Germany

[21] Appl. No.: 785,170

[22] Filed: Oct. 7, 1985

[30] Foreign Application Priority Data

Oct. 16, 1984 [DE] Fed. Rep. of Germany ....... 3437808

[51] Int. Cl.$^4$ .......................... F16D 7/02; F16D 25/04
[52] U.S. Cl. ................................ 192/0.032; 192/56 R; 192/88 A; 192/101; 192/150
[58] Field of Search ................. 192/0.034, 0.032, 0.03, 192/56 F, 56 R, 150, 142 R, 139, 103 R, 101, 88 A

[56] References Cited

U.S. PATENT DOCUMENTS 4,321,991 3/1982 Teijido et al. .................... 192/0.034
4,393,966 7/1983 Kono et al. ....................... 192/56 R

FOREIGN PATENT DOCUMENTS 018603 11/1980 European Pat. Off. .

Primary Examiner—George H. Krizmanich
Attorney, Agent, or Firm—Frishauf, Holtz, Goodman & Woodward

[57] ABSTRACT

The transferred torque is continuously measured at a predetermined machine portion. A torque-dependent comparison signal is generated and compared with a predetermined maximal torque limit value. When the limit value is reached or exceeded, a positioning signal is generated, and the switching element releases the clutch. The generation of the torque-dependent comparison signal is effected in accordance with the measurement function $M = M(t) + dM/dt \cdot \Delta t$. In addition to measuring the transferred torque M(t), the variation dM/dt of the torque M(t) is also detected as a function of time, and subsequently the torque obtained as a comparison signal from the variation dM/dt at the end of a predetermined time interval $\Delta t$ following the particular time of measurement is used as a comparison signal. The clutch is preferably formed with end face teeth.

15 Claims, 7 Drawing Figures

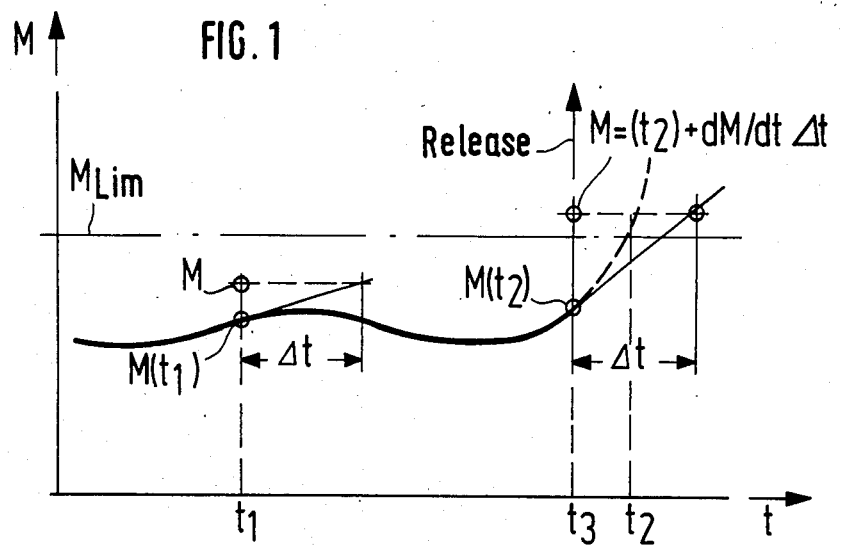
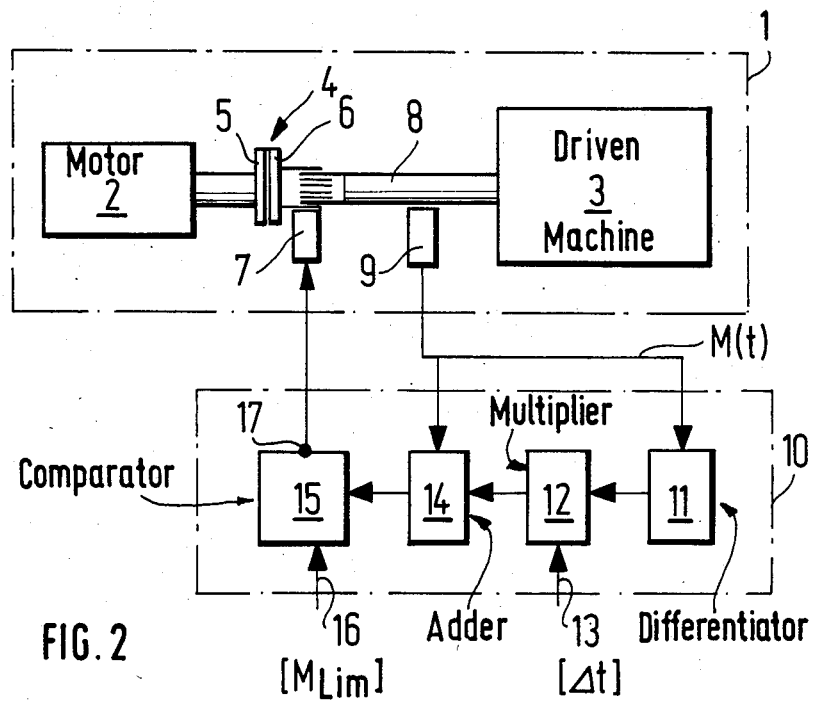

METHOD AND SYSTEM TO TRIGGER RELEASE OF A SAFETY DISCONNECT CLUTCH

The present invention relates to a method, system and an apparatus to trigger release of a safety disconnect clutch in dependence on torque being transferred from a driving shaft to a driven shaft, for example from a driving motor to a driven machine, and more particularly to a system in which a disconnect trigger signal is obtained to trigger disconnection of a safety clutch, and prevent damage to the driving shaft and/or the driving motor, as well as the driven shaft and/or the driven apparatus, machine or device.

BACKGROUND

For machine systems of the most varied kinds, it is often necessary to provide a safety disconnect clutch, which isolates a particular portion of the system from the driving portion of the system if there is an overload for instance in order to protect gears on the input side, or the driving motor itself, from becoming damaged. When switchable clutches were used to this end, it was previously possible only to measure the transferred torque continuously via a measuring shaft and to compare the measured value with a specified maximal value for the maximum allowable torque, so that if this value was exceeded the safety disconnect clutch is actuated. Both the measuring operation and in particular the release operation takes a certain amount of time, because of the inertia of the parts that must be moved during the release process, so the specificable maximal value for the maximum allowable torque must be set preceptibly below the still-allowable critical torque, so as to assure that in the event of an overload the clutch will in fact be released even before the maximum allowable critical torque is reached. Since as a rule the transferred torque is not constant but instead varies because of varying loads, torsional vibrations in the shaft system or the like, the above-described margin of safety for the maximum torque value to be specified is attainable, and the safety disconnect clutch is actuatable, although an increase beyond the maximum allowable critical value may not have occurred over the course of the torque. On the other hand, particularly in the case of machine system interruptions leading to overload situations, as in crushing apparatus or the like, the torque rise can take such a steep course that the margin of safety factored into the monitoring device when the maximum torque value is specified is inadequate to release the safety disconnect clutch before the maximum allowable critical torque is reached. Hence driving and driven parts of the system may be damaged despite the actuation of the safety disconnect clutch.

THE INVENTION

It is an object of the invention to improve the above general method such that the safety disconnect clutch initiates the switching operation even prior to reaching the specified torque limit value, whenever the actual torque behavior indicates that the specified torque limit value is about to be exceeded.

Briefly, a torque-dependent comparison signal is generated in accordance with the measurement function $M = M(t) + dM/dt \cdot \Delta t$. In addition to measuring the transferred torque $M(t)$, the variation $dM/dt$ of the torque $M(t)$ as a function of time is detected, so that the torque M resulting from the rate of change $dM/dt$ at the end of a specified time interval $\Delta t$ following the time of measurement will be available as a comparison signal.

This method has the advantage that in generating the comparison signal, the temporal variation of the torque is taken into account as well, such that the theoretically expected torque value in a predetermined period of time is detected by extrapolating the direction of variation of the measured torque behavior. In the ranges involved here, it is sufficient to perform a linear extrapolation, because the predetermined time interval assures that the clutch will already have been disconnected by the time the specified torque limit value is exceeded. For the time interval $\Delta t$, it is possible to make an individual adaptation to the switching time characteristic for the particular clutch system used.

The extrapolation additionally performed by this method produces a reliable disconnection, both when there is a sudden load increase, and when the load increase is gradual yet nevertheless leads to the exceeding of the specified torque limit value, because of actual conditions prevailing in the machine system. Since the characteritic switching time of the clutch system is taken into account in the method by specifying the time interval $\Delta t$, a reliable switching of the safety disconnect clutch is effected even if there is a sudden load increase so that the machine parts that are to be isolated are reliably protected from an overload.

In accordance with a feature of the invention, a torque monitoring system for machine systems is provided for carrying out the method. The system includes a switchable safety disconnect clutch provided with a switching element for a positioning drive, and a torque measuring device is disposed on a predetermined part of the machine. This device generates an electrical signal as a function of the measured transferred torque, and this signal is delivered to an electrical comparison device, the signal output of which is connected to the switching element, so that if a specified maximal torque value (limit value) is exceeded, the signal present at the output of the comparison device actuates the switching element of the positioning drive that is coupled with the movable portion of the clutch.

In accordance with a further feature of the invention, it is provided that the electrical comparison device has a computing stage for generating the comparison signal in accordance with the specified measurement function $M = M(t) + dM/dt \cdot \Delta t$, which has a differentiator means to determine the value $dM/dt$ of the variation of the measured torque $M(t)$ as a function of time, a multiplier means to determine the factor $dM/dt \cdot \Delta t$, and an addition means at the signal output of which the comparison signal is available, which is connected to a limit value comparison means, and that the signal output of the limit value comparison means is connected to the switching element for a movable portion of the clutch.

A torque monitoring system embodied in this way is distinguished from the conventional monitoring system, in which only the comparison of the measured torque $M(t)$ with the specified limit value was performed, in that in addition to this measured value, the torque M to be expected within a specified time interval $\Delta t$ because of the course of the torque over time is taken into account as well, and it is not the measured torque value $M(t)$ that is compared with the limit value, but the extrapolated torque value M; accordingly, if the limit value is reached or exceeded, the switching element will already have been triggered, in fact by the length of the time interval $\Delta t$ prior to when the extrapolated torque value M would reach the torque limit value. By means of the time interval Δt, it is possible to specify at least the time which is required for the complete disengagement of the clutch. This has the advantage, among others, that the torque limit value that is to be specified can maintain a slight margin of safety with respect to the maximum allowable critical load value of the machine portion involved. Thus, in comparison with the torque monitoring systems of the prior art, a response can take place later, without endangering the machine system, and thus interruptions in operation can occur only when an overload that would endanger the machine system does in fact occur.

The method according to the invention and the monitoring system according to the invention for carrying out the method can be adapted to any existing switchable safety disconnect clutch by specifying the extrapolation member $dM/dt \cdot \Delta t$ of the measurement equation. However, in order to optimize the monitoring system according to the invention, it is important for the switching time required for complete disengagement to be as short as possible, so that the margin of safety dictated by the time interval Δt can be made shorter, or so that, in machine systems having a highly fluctuating torque variation with a steep torque rise, the clutch can be reliably disengaged before the torque limit value is reached or exceeded. Since the disengageable, i.e., movable portion of the clutch has a considerable weight, especially in clutches intended for transferring high torque, and since large forces due to mass must be overcome within the shortest possible time when the clutch is switched, correspondingly large positioning forces must also be available. On the other hand, since the energy for actuating the positioning drive must be transferred to a rotating part and electrical energy is typcially used to do this, there are limits, in terms of the electrical capacity, to the force that can be brought to bear.

In accordance with another feature of the invention, in order to be able to induce large switching forces, it is provided that the movable clutch portion is retained in its operating position by the positioning drive counter to the force of a spreading spring, and that in a manner known per se the two clutch portions are interengagingly joined with their axial engagement surface, preferably via end face teeth. This arrangement has the advantage that the force for disconnecting the two portions of the clutch does so, after the release by the positioning drive, via the spreading spring, and when end face teeth, in particular serrated teeth, are used, then it does so additionally via the component, imparted by the inclination of the tooth flanks, of the circumferential force originating from the torque. The electrical energy that is available via an amplification of the output signal of the limit value comparison means then needs merely to be set up for the requirements of the positioning drive.

In an embodiment of the invention, it is provided that the positioning drive is provided by a pressure bag or cushion of some flexible material, which is filled with gas under pressure and has a valve as its switching element; this pressure bag keeps the movable portion of the clutch in the operating position. In such a system, the only positioning force required is the force necessary to open the valve. To provide the shortest possible switching time for the clutch, this valve must have a large flow cross section, so that the gas charge is emitted virtually at once. In its simplest form, a completely closed pressure bag is provided, which is associated with a rupturing knife joined to a positioning drive; upon actuation, this knife punctures the wall of the pressure bag, and the slit thus formed enlarges under the force of the internal pressure.

In another embodiment of the invention, it is provided that the positioning drive has at least one cam element that is movable relative to the movable portion of the clutch. This clutch part is supported in the axial direction on the cam element, which is provided with a drive mechanism. This embodiment is particularly advantageous when serrated end face teeth are used on clutches for transferring high torque, because in this case, via the inclination of the tooth flanks of the clutch part, the movable clutch part is urged in the axial direction by a force that is approximately half the circumferential force exerted upon the clutch by the torque. In the case of fast-moving and/or high load moments, this axial force can no longer be borne via a corresponding roller bearing on a fixed part of the machine, which is provided with the switching means. With the proposed system according to the invention, however, it is possible to intercept the axial force, originating in the load moment, via the cam element on a correspondingly arranged flange, so that in the operating position a reliable, interengaged connection is provided, which is independent of external influences such as wear resulting from operation. Here again, only the force required to displace the cam element needs to be furnished as a positioning drive, and with suitable inclination of the cam the axial force acting on the movable clutch portion, which is brought to bear both by the driving moment and, after the switching operation begins, by the spreading spring, reinforces the displacement of the cam element.

In a preferred embodiment of the invention, it is provided that the drive means for the cam element is provided by a prestressed compression spring, and that a sear engaging the cam element counter to the force of the compression spring is provided as the switching element, which is connected to a further drive means that is in communication with the signal output of the limit value comparison means. By so embodying the positioning drive, the safety disconnect clutch can be opened in the shortest possible time, even when the parts that are to be moved have large mass, using a small amount of energy, preferably electrical energy, that is to be furnished via the monitoring circuit.

In view of the high axial forces that must be intercepted via the cam element during operation, it is particularly advantageous that a ring which is coaxial with the axis of rotation of the movable clutch part and is supported such that it can rotate relative thereto is provided, which on its side facing the clutch part has at least two zones embodied as cam elements, each of which is associated with a guide body on the clutch part. As the positioning drive for the ring, here again one or more compression springs, optionally prestressed, can be provided, which act upon the ring in the circumferential direction; thus to release the clutch, it is again necessary merely to release a sear, which maintains the ring in its operating position. The ring is suitably supported both radially and axially, on the shaft supporting the movable portion of the clutch, via bearings, preferably roller bearings.

In another embodiment of the invention the positioning drive is provided by at least one toggle axially supported on the movable portion of the clutch and articulated with one end on the clutch part and with its other end on a flange, and the toggle joint is connected to a switching means that is triggerable by the signal output of the comparison means. A positioning drive of this kind also has the advatnage than in the operational position it provides a rigid connection, and yet it is capable of triggering a release of the clutch using small forces. Since the switching element engages the toggle joint, the further opportunity is provided, if the switching element is designed accordingly, of further reinforcing the spreading spring which during disconnection acts in the axial direction upon the movable portion of the clutch. Suitably, the toggle is radially pivotable with respect to the axis of the shaft, and the toggle joint is pivotable only radially inward. This has the advantage that the positioning drive is maintained in the closed position by centrifugal force. It is also suitable in this respect for the toggle joint to be angled over radially outwardly in the form of a toggle in the operational position of the clutch. This increases security against unintentional opening, because the toggle is angled over only when there is a defined exertion of force, whereupon the safety disconnect clutch can be opened.

DRAWING

FIG. 1 is a schematic torque diagram intended to explain the method according to the invention;

FIG. 2 is a block circuit diagram for a monitoring system for carrying out the method;

FIGS. 5 and 5a show an embodiment having a cam ring that is rotatable relative to the movable clutch part.

DETAILED DESCRIPTION

Figure 3:
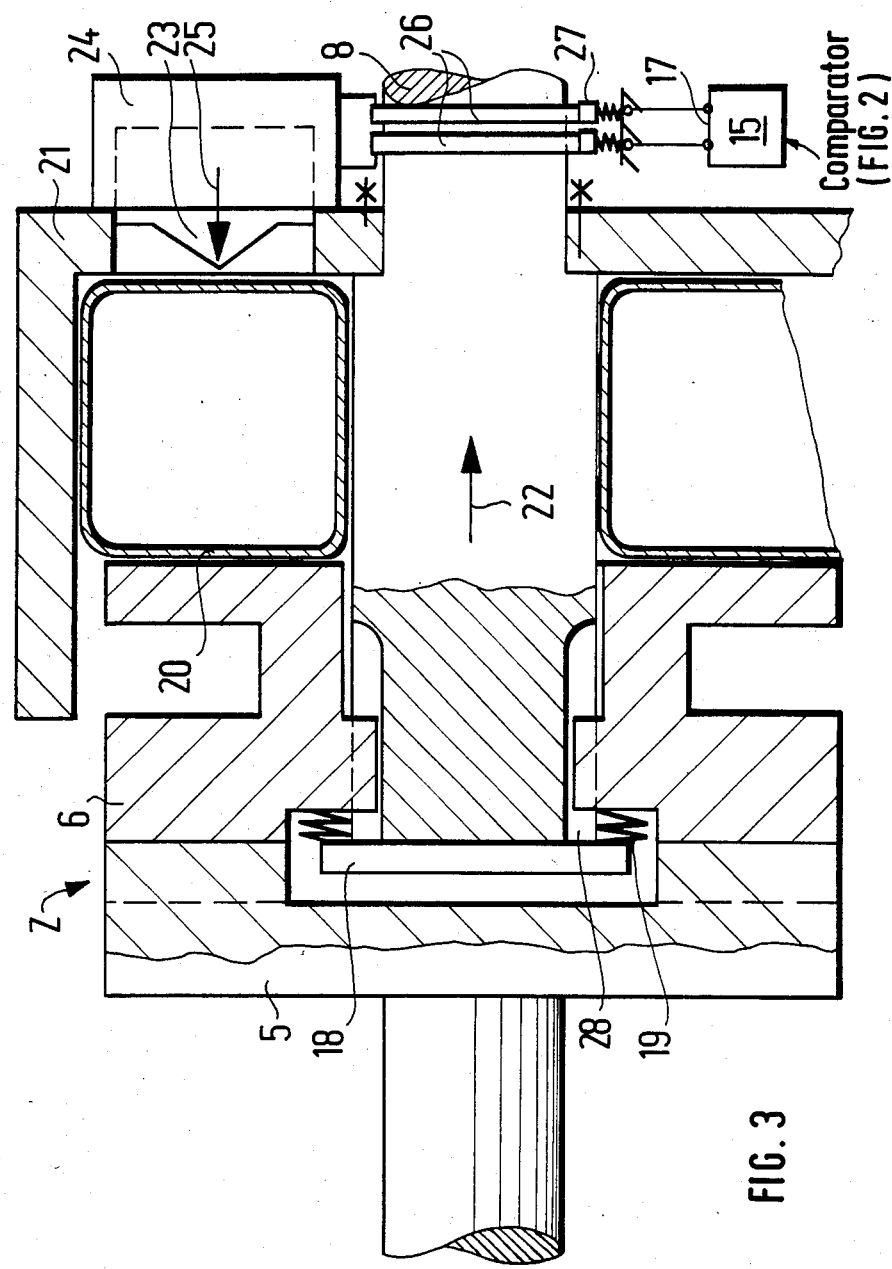
FIG. 3 shows an embodiment having a bag filled with compressed gas, for supporting the movable portion of the clutch.

In FIG. 1, the course of the torque curve of a machine system over time is shown in schematic form. The course of the torque curve M(t) is representative of the torque transferred by a specific shaft portion. The allowable torque limit value $M_{Lim}$ is shown above the curve of the torque course M(t). The actual torque transferred by the machine part, for instance a measurement shaft, is measured continuously, and at an arbitrary time $t_1$ the transferred torque has the magnitude $M_{t1}$. As the course of the torque curve shows, the actual torque transferred by the shaft portion is not constant, but instead fluctuates within certain limits. At the time $t_1$ selected for purposes of explanation, the course of the torque curve is still rising, and the angle of rising slope is described by the factor dM/dt which is also detected with the measuring circuit. If this value dM/dt is multiplied by a firmly specified time $\Delta t$, then at time $t_1$ the comparison signal that is available is not the value $M_{t1}$, but rather the value M, which in the present example is higher. Since this higher value M is still below the limit value, no positioning signal is generated. Since the measurement of the torque and the detection of the value dM/dt are done continuously, the comparison signal M is also continuously available for comparison with the specified limit value.

If at some later time an interruption in the machine system causes an overload, with a sharp rise in the torque, then a torque monitoring system of the conventional type, which allows only a simple comparison of the actual torque value with the limit value, would trigger the positioning signal that releases the clutch at time $t_2$. In the case where the torque is rising this steeply, damage to the machine system can already be occurring by this time, if the allowable limit value is set as high as possible.

However, if the measurement function $M = m(t) + dM/dt \cdot \Delta t$ is specified for the monitoring function, then the extropolation $dM/dt \cdot \Delta t$ has the result that a comparison signal which agrees with the limit value is already available at a time $t_3$, so that the positioning signal that triggers the release of the clutch initiates this release of the clutch at a perceptibly earlier time than is possible with a conventional monitoring system.

In FIG. 2, the monitoring system is shown in the form of a block circuit diagram. A machine system 1, shown in simplified form, comprises a drive motor 2 and a driven machine 3. These two units are joined together via a switchable safety disconnect clutch 4, which comprises a fixed clutch part 5 and a movable, i.e., selectively disengageable clutch part 6. A positioning drive 7 which responds to a positioning signal is associated with the movable clutch part 6 and thereby disengages the clutch part 6. The clutch may be of any arbitrary type. However, a direct position engagement coupling is preferably used, which may take the form of a claw clutch or one with end face teeth, for instance serrated teeth.

A specificable shaft portion between the drive motor 2 and the driven machine 3, the selection of which is substantially determined based on its accessibility, in this instance the shaft poriton 8 by way of example, is formed in combination with a measuring transducer 9 as a torque measuring shaft. The measurement may be done electrically, for instance via strain gauges, or magnetic-inductively via two grooved disks located spaced apart from one another on the measuring shaft.

The measured signal M(t) generated by the measuring transducer 9 is now delivered to a computing stage 10. This computing stage 10 substantially comprises elements for processing the measured signal and for generating the comparison signal. The measured signal M(t) is delivered to a differentiating computer unit 11, in which the rate of change dM/dt of the measured torque is detected. This value is delivered to a multiplier unit 12, which is also provided with the value $\Delta t$, which can be specified in either a fixed or and adjustable form via an appropriate control means 13. The value formed in the multiplier unit 12 is finally delivered to an addition unit 14, at which the measured value M(t) is also available. The value formed in this addition unit represents the comparison signal, which is furnished to a comparator unit 15, in which the comparison signal is compared with a torque limit value $M_{Lim}$ that can be specified in either a fixed or an adjustable form via an appropriate control means 16. A positioning signal is then present at the signal output 17 of the comparator device whenever the comparison signal is equal to or greater than the specified torque limit value, as described in conjunction with FIG. 1. The positioning signal is then delivered, after optional amplification, to the positioning drive 7 on the safety disconnect clutch 4, and the positioning drive 7 moves the disengageable portion 6 of the clutch.

The positioning drive for the movable portion 6 of the safety disconnect clutch is also an important component of the monitoring system described in conjunction with FIG. 2. The important aspect here is that when there is a positioning signal the clutch should open with the least possible hysteresis, so that the advantages of the "anticipation" described in conjunction with FIG. 1 can be fully exploited. The critical factor here is to be able to exert the required positioning forces, without having to amplify the the positioning signal excessively, because preferably the positioning signal simultaneously furnishes the energy for actuating the positioning drive as well. On the other hand, since with the fastest possible movement of the disengageable clutch portion 6, considerable forces of mass must be overcome, the "positioning force" must be already integrated into the clutch, so that the positioning signal has to actuate merely an additonal switching element which releases this positioning force.

The schematic illustration in FIG. 3 shows a first exemplary embodiment of a switchable clutch of this kind, which as an interengaged clutch is provided with serrated teeth on the end faces of both the fixed clutch portion 5 and the movable clutch portion 5. In FIG. 3, the clutch is shown in its operational position.

The movable clutch portion 6 is axially guided in a displaceable manner on the axially grooved and splined end of the shaft 8. A spreading spring 19, which in the operational position shown is compressed, is located between an end flange 18 and the movable clutch part 6. The movable clutch part is supported in this example on a pressure bag or cushion 20 filled with compressed gas, which is in turn supported on a support housing 21 firmly joined to the shaft 8. By means of the pressure bag 20, the movable part 6 of the clutch is maintained in the operational positon counter to the force of the spreading spring 19, and during operation counter to the axial component, exerted by the teeth Z, of the circumferential force as well. If the pressure bag is now emptied, then under the influence of the axial component of the circumferential force exerted by the teeth Z and by means of the force of the spring 19, the movable clutch portion 6 is displaced in the direction of the arrow 22, so that the clutch opens and the shaft between the motor 2 and the driven machine 3 is disconnected.

The pressure bag 20 can now be provided with a valve which has a large flow cross section and is connected to an appropriate switching element. If the positioning signal is now triggered if the limit value that has been set is exceeded, then the valve is opened via the switching element. The compressed gas can escape, and the movable clutch part 6 can be displaced into the open position by the forces acting upon it.

In the exemplary embodiment shown here, a slitting or rupturing knife 23 is provided, instead of a valve; it is conncteed to a positioning drive 24, and in the quiescent position shown it is displaceably guided in the support housing 21 in the direction of the arrow 25. The pressure bag 20 is then completely filled with compressed gas at appropriate initial pressure and hermetically sealed; for this, a small, sealable filling valve, not shown in detail here, is sufficient.

Operation: Upon an appropriate positioning signal, the slitting knife 23 is pressed into the pressure bag 20 by the positioning drive, thereby opening it. Depending on the selected size of the knife which may be an X-shaped knife, an opening can be cut into the pressure bag 20 that is large enough to allow the compressed gas to escape all at once, so that the movable clutch part 6 can disengage in the shortest possible time.

The positioning drive 24, which may also act upon an appropriately embodied valve, given an appropriately embodied pressure bag 20, now communicates via a slip ring connection 26, 27 wtih the signal output 17 of the comparator unit 15, so that when a positioning signal appears at the signal output 17, the positioning drive 24 is actuated. Instead of a slip ring connection 26, 27, the positioning signal can also be transmitted in a non-contacting manner, given an appropriate embodiment of the positioning drive 24.

The embodiment shown in FIG. 3, which has a certain elasticity in the axial direction because a pressure bag is used to support the disengageable clutch portion 6, is suitably used only in instances in which it is assured that a constant torque is transmitted during normal operation. If there are pulsating torques, then a claw coupling of conventional design, that is, a claw coupling having a 90° flank angle, must be used instead of the serrated teeth mentioned above, so that the axial forces originating in the torque and acting upon the clutch portion 6 can be rendered ineffective.

Figure 4:
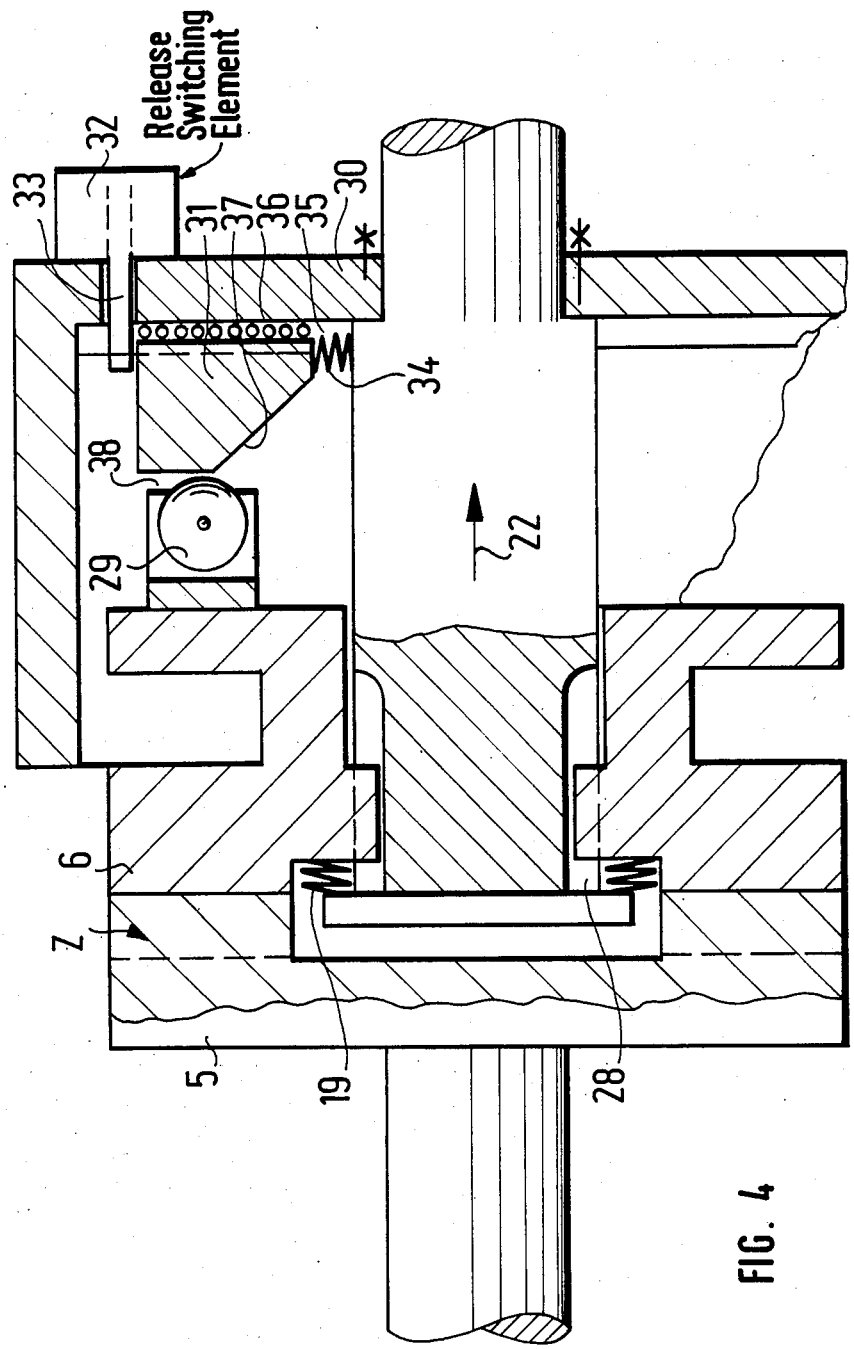
FIG. 4 shows an embodiment having a radially movable cam element for supporting the movable portion of the clutch.

FIG. 4 shows an embodiment which allows the use of the serrated teeth even when pulsating torques are being transferred. The drawing shows in detail only the movable portion of the clutch. The movable clutch portion, provided with the toothed ring Z, is again guided in an axially displaceable manner on a shaft 8 which is grooved and splined at 28. On the side remote from the teeth Z, the clutch portion 6 is provided with one or more support rollers 29, depending on the construction of the axial guidance. Spaced apart therefrom, a support flange 30 is secured to the shaft 8, for instance being firmly joined to the shaft 8 or else being a separate part screwed onto the shaft, as shown here. On the side of the support flange 30 oriented toward the clutch portion 6, a cam track 31 is guided in a radially movable manner, and the support roller 29 is supported on it in the operational position shown, so that the clutch part 6 is maintained in engagement with the clutch portion 5, not shown here, and counter to the force of the compressed spreader spring 19.

A locking means 33 connected to a release switching element 32 maintains the cam track 31 in its operational position counter to the force of a compression spring 34. The cam track 31 is guided with as little friction as possible in a groove 35 of the support flange 30. To this end, a ball race supported carriage 36 may for instance be provided. The switching element 32 is connected in turn with the comparator device 15 via appropriate transmitting means for transmitting the positioning signal.

Operation: In the operating position, this embodiment is absolutely rigid in the axial directon. However, if the locking means 33, similar to a sear, is released via the switching element 32, e.g., a solenoid, then the compression spring 34 moves the cam track 31 radially outward, so that the movable clutch portion 6 can then be displaced axially in the opening direction, that is in the direction of the arrow 22. The contoured surface 37 of the cam track 31 is relatively steep here, in order to attain the fastest possible opening speed. In the operational positon, the contoured surface 37 has a "detent" in the form of a radially extending surface 38, so that during operation no force is exerted on the cam track in the radial direction, except for the action of the compression spring 34.

Figure 5:
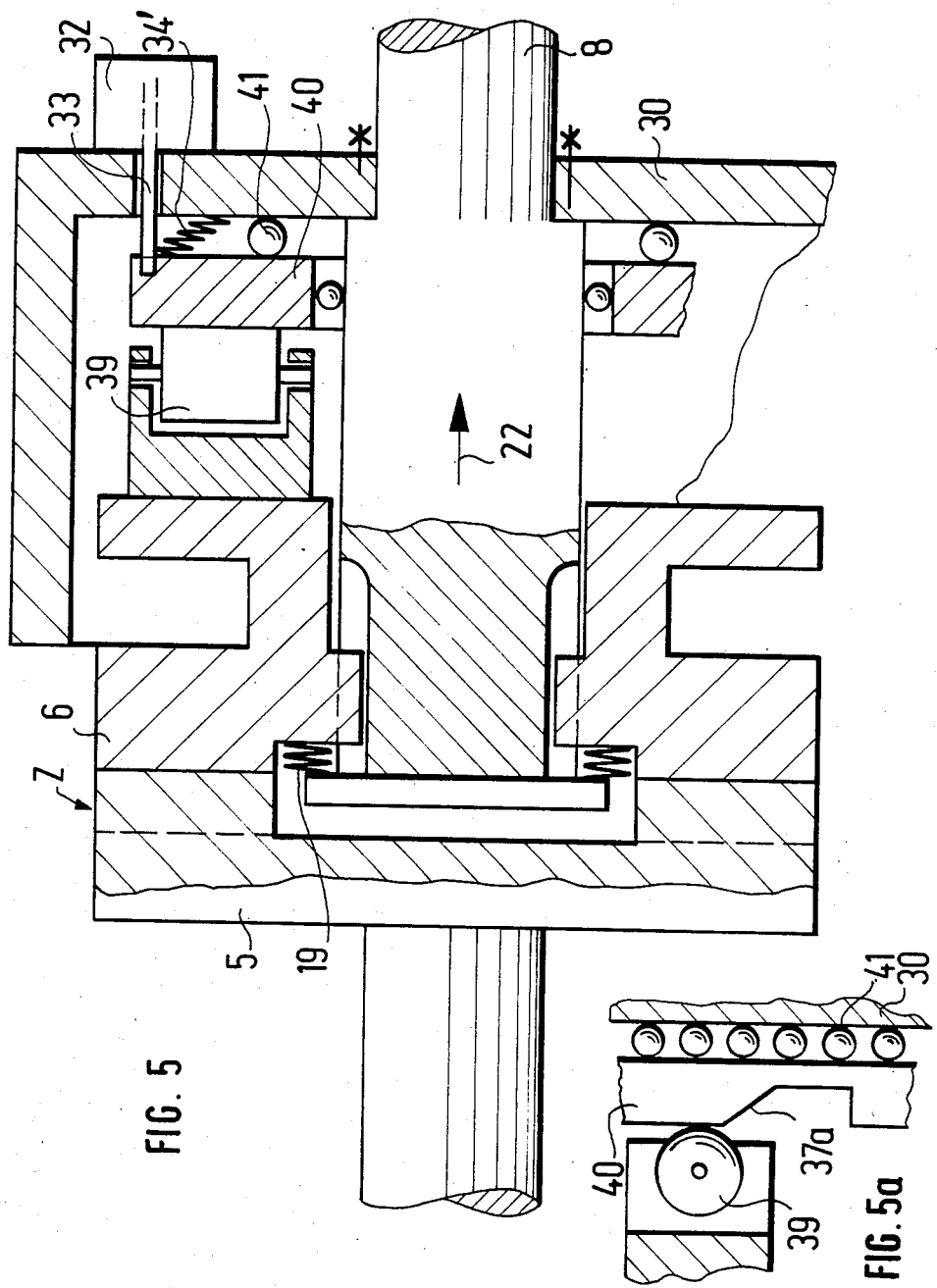

In the embodiment of FIG. 4, the movable clutch portion 6 must have an axial flange, if it is intended that only one cam track 31 be used or if on the other hand two cam tracks must be used to attain a symmetrical axial support, and thus two switching elements must accordingly be used as well. FIG. 5, however, shows a modification of the system of FIG. 4 in which a support of the clutch portion 6, distributed uniformly over the circumference, can be effected using only one switching element.

To this end, the clutch portion 6 is provided with a plurality of roller bodies 39 distributed uniformly about the circumference, the axes of rotation of which are oriented radially. The roller bodies 39 are supported on a ring 40 that is rotatable coaxially with and relative to the shaft 8, and that is provided with contoured surfaces 37a corresponding in number to the number of roller bodies 39, as shown in the plan view of FIG. 5. The ring is supported in the axial direction on the flange 30 via an axial bearing, such as a roller bearing 41, which is shown merely schematically here. The ring 40 is rotated counter to the force of a plurality of compression springs 34', acting at a tangent between the support flange 30 and the ring 40, into the operational position shown in FIG. 5a, in which it is maintained by a locking means 33, which in turn is connected to a switching element 32. The compression spring 34' is shown only schematically here. As soon as the positioning signal becomes operative at the switching element 32, the switching element 32 retracts the locking means 33, so that the compression spring assembly 34' rotates the ring 40 relative to the shaft 8, and hence the support rollers 39 can roll off via the contoured surface 37a, and thus the clutch portion 6 can be disengaged under the influence of the spreader spring 19.

Figure 6:
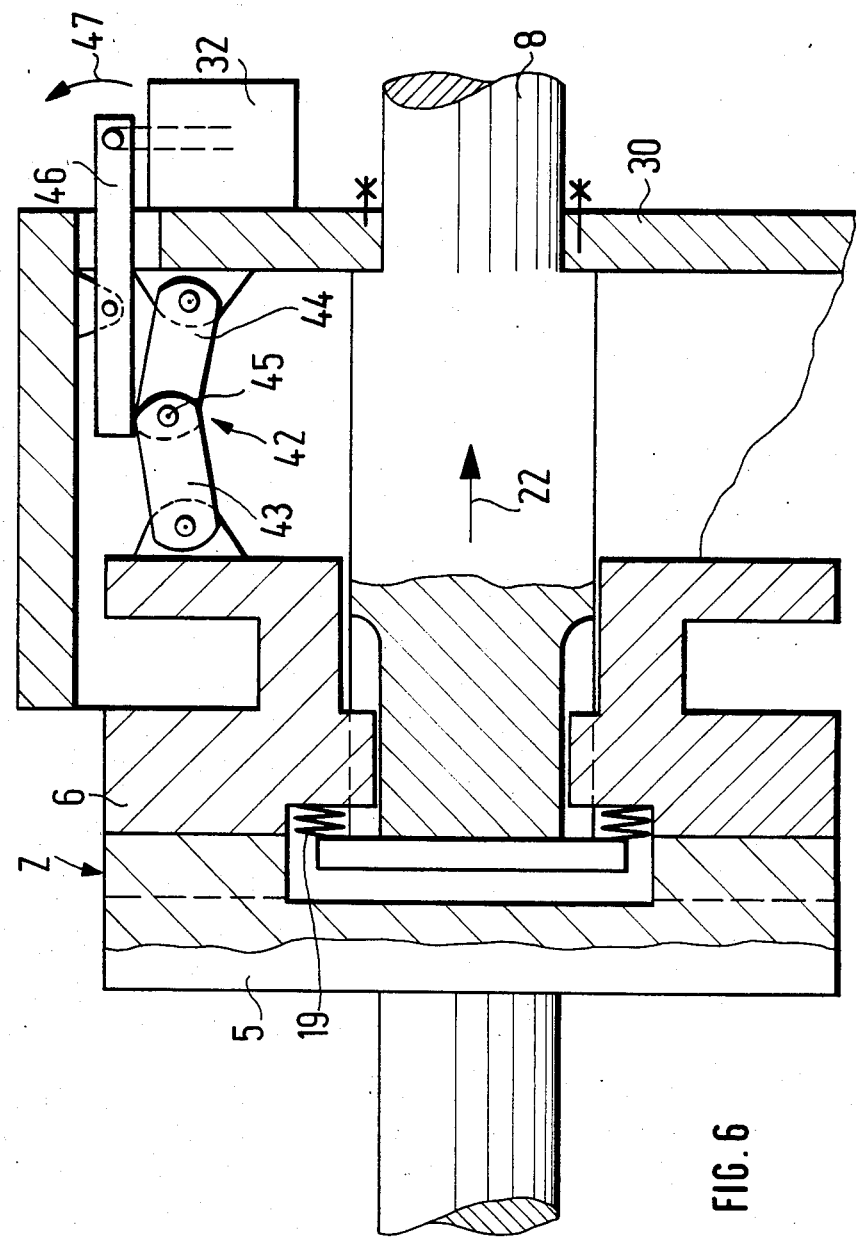
FIG. 6 shows a support effected via a toggle arrangement.

Finally, in FIG. 6, a further embodiment is shown, which again assures a rigid support of the movable clutch portion 6 in the operational position, but still, like the use of cam tracks, enables an abrupt opening of the safety disconnect clutch upon actuation. In this embodiment, the movable clutch portion 6 is supported via one or more toggle lever arrangements 42 distributed uniformly about the circumference of the support flange 30. One lever 43 of this arrangement is articulated on the clutch portion 6, and the other lever 44 is articulated on the support flange 30. The toggle joint 45 joining the two levers 43, 44 is formed such that in the operational position shown, which is somewhat angled over outwardly, it is rigid and can only bend over radially inwardly. On the outside of the toggle joint, a transfer means is provided, for instance in the form of a double-armed lever 46 which is supported on the support flange 30, and the transfer means is connected to the switching element 32, for example a plunger magnet coil. As soon as the switching element 32 is activated, the lever 46 is pivoted in the direction of the arrow 37 and the toggle joint 45 is thereby angled inwardly over. As soon as the dead center position of the toggle lever arrangement 42 is overcome, the movable clutch portions 6 is abruptly retracted in the direction of the arrow 22 by the spring 19. The arrangement may be designed such that the switching element 32 already acts upon the toggle lever arrangement 42, via the transfer means 46, during the opening movement, so that in addition to the force of the spreader spring 19, force is effectively exerted in the opening direction via the toggle lever arrangement. The switching element 32 can also exert its action below the toggle joint arrangement, directly onto the toggle joint 45.

I claim:

1. Method of triggering release of a safety disconnect clutch, between a driving shaft portion and a driven shaft portion, particularly to isolate a drive motor (2) from a driven apparatus (3), including a release system having torque transducer means (9) continuously measuring torque being transferred between the driven and the driven shaft portions, and providing a continuous torque signal (M(t));

means (16) for furnishing a torque limit value ($M_{Lim}$), and comparator means (15) coupled to receive the limit value for providing a trigger release positioning signal (17) when the limit value is exceeded, comprising the steps of generating a comparison signal, applied to the comparator means (15) for comparison with the limit value, by generating a signal in accordance with the relationship $$M = M(t) + dM/dt \cdot \Delta t$$

wherein M(t) is the continuously measured torque signal, and $\Delta t$ is a timing interval, said generating step comprising differentiating the continuous torque signal (M(t)) to derive the time derivative of the torque, and generate a rate-of-change-torque-change signal (dM/dt);

providing a signal representative of a predetermined timing interval ($\Delta t$);

determining a theoretical value of a torque based on the rate-of-change-torque-change signal, as determined in said differentiating step, upon elapse of said predetermined time interval; and comparing the so-obtained theoretical torque value, representative of a theoretical torque at the end of said timing inverval, with the limit torque value.

2. Method according to claim 1, including the step of providing a clutch release signal if the comparison step indicates that the limit torque value is exceeded.

3. System of triggering release of a safety clutch between a driving shaft portion and a driven shaft portion, particularly to isolate a drive motor (2) from a driven apparatus (3), including a release system having torque transducer means (9) continuously measuring torque being transferred between the driving shaft portion and the driven shaft portion, and providing a continuous torque signal (M(t));

means (16) for furnishing a torque limit signal;

comparator means (15) coupled to receive the limit torque signal and providing a trigger release positioning signal (17) when the limit signal is exceeded, said clutch (4) having a fixed part (5) and a movable part (6) and positioning means (7) coupled to the movable clutch part to disconnect the clutch under control of said comparator means (15) and based on said positioning signal (17)

and comprising, means 11, 12, 14 generating a comparison signal, for application to the comparator means (15) for comparison with the limit signal, and for generating a signal in accordance with the relationship $$M = M(t) = dM/dt \cdot \Delta t$$

wherein M(t) is the continuously varying torque signal, and

Δt is the signal representative of a predetermined time interval, said comparison means including differentiator means (11) for continuously differentiating the torque signal (M(t)) to provide a time-derivative of the torque and generate a rate-of-torque-change siganl (dM/dt);

means (13) for providing a signal representative of a predetermined time interval (Δt);

multiplier means (12) coupled to receive said time interval signal (Δt) and the rate-of-torque-change signal (dM/dt) to provide a theoretical value of change in torque during said predetermined time interval;

adder means (14) adding said theoretical change in torque during said time interval to the then existing torque, receiving said torque signal (M(t)) and the output from said multiplier means to provide a signal representative of the theoretical value of torque based on the rate of change of the torque signal upon elapse of said predetermined time interval, said adder means being connected to control the input to the comparator means (15) for comparison with said torque limit signal;

and coupling means (17) for controlling the positioning means (7) of the movable clutch portion (6) if the output from the comparator means indicates that the theoretical torque value signal exceeds the limit signal.

4. System according to claim 3, including a stressed spreader spring (19) coupled to the movable clutch portion (6) and tending to move the movable clutch portion (6) out of engagement with the fixed clutch portion (5);

and interengaging means formed on the clutch portions (5, 6) to maintain said clutch portions in driving engagement counter to the force of said spring (19).

5. System according to claim 4, wherein said interengaging means are axially facing teeth (Z).

6. System according to claim 4, wherein said positioning means comprise a flexible pressure bag or cushion (20) pressing the movable clutch portion (6) counter to the force of the spring in engagement with the fixed clutch portion;

and valve means controlled by the output from said comparator means to release fluid pressure from within the flexible pressure bag or cushion.

7. System according to claim 6, wherein the pressure bag or cushion is rupturable;

and the valve means comprises knife means rupturing the pressure bag or cushion under control of the comparator means.

8. System according to claim 4, wherein said trigger release positioning means (7) comprises a cam track (31, 40) and operating means coupled to the movable clutch portion (6) and engageable, under control of said comparison signal, with a portion of the cam track to, selectively, maintain the movable clutch portion (6) in engagement with the fixed clutch portion (5) or, permit the movable clutch portion to move into disengaged position under force exerted by said spring.

9. System according to claim 8, wherein the cam track is movable and includes moving means (34) coupled to and controlled by the comparison signal;

and cam follower means coupled to the movable clutch portion (6).

10. System according to claim 9, wherein said moving means is a prestressed compression spring (34) coupled to the cam track (31, 40); and further including a switching element or sear (32) retaining the movable cam track (31, 40) counter to the force of the prestressed compression spring (34), and operable under the control of the comparator means (15) to release the switching element or sear (32) upon receipt of a signal (17) from the comparator means 915) that the limit has been exceeded.

11. System according to claim 10, further including a linkage (32) coupled to the switching element or sear.

12. System according to claim 10, wherein the cam track comprises a ring (40) coaxial with one of said shaft portions and having two cam portions, one of which retains said movable clutch portion in engagement with the fixed clutch portion and, upon engagement with the other cam portion, permitting release of said movable clutch portion from the fixed clutch portion under force of said prestressed compression spring;

and cam follower means (39) engageable with said cam track portions and coupled to said movable clutch portion.

13. System according to claim 5, including a toggle (42) having a joint (45) retaining the movable clutch portion (6) in engagement with the fixed clutch portion (5);

a flange (30) secured to that one of the shaft portions of which the movable clutch portion forms a part;

and trigger release positioning means (32, 46) coupled to said comparator means (15) and operable under control of a signal therefrom, engageable with said toggle (42) to break the toggle and permit disengagement of the clutch portions under the force of said spreader spring (19).

14. System according to claim 13, wherein the toggle (42) is movable radially with respect to the axis of the shaft, and breaking the toggle comprises moving the toggle joint (45) inwardly in relation to the respective shaft portion.

15. System according to claim 13 wherein, in quiescent position, the toggle joint is positioned slightly radially outwardly from a line connecting end portions of the toggle link.

* * * * *